United States Patent Office 3,413,895
Patented Dec. 3, 1968

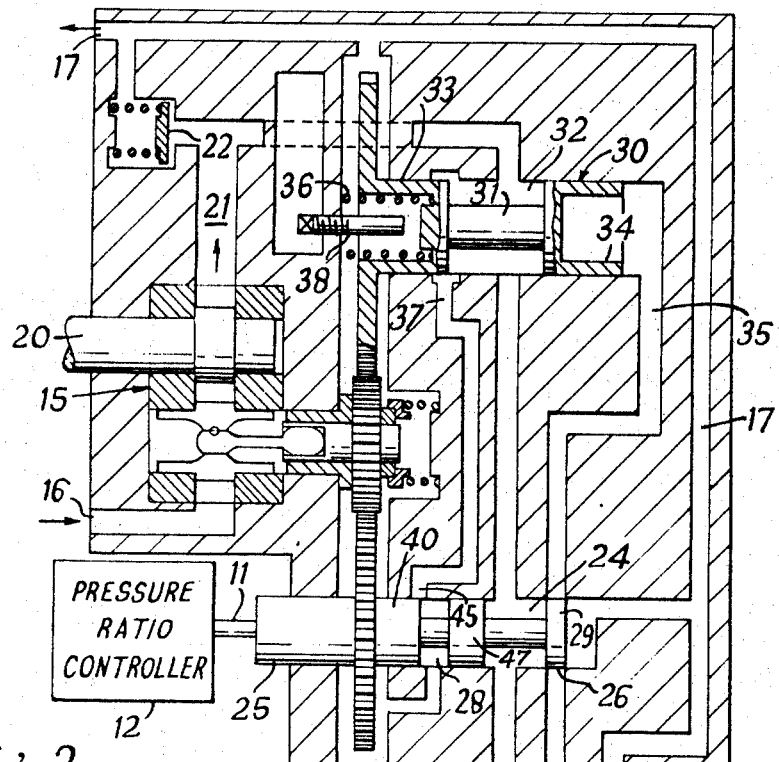
Fig. 2.
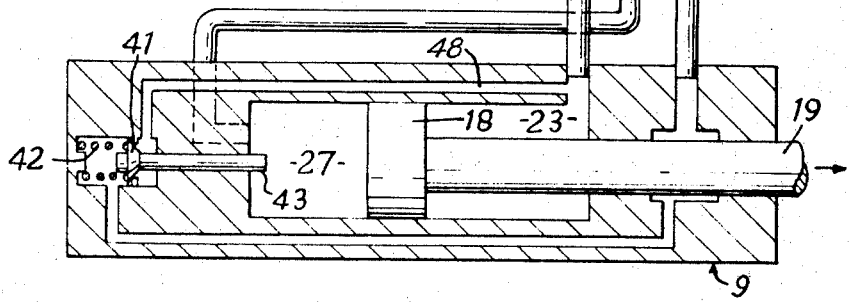

3,413,895
AUTOMATIC CONTROL OF PISTON-TYPE
HYDRAULIC ACTUATORS
Robert B. Matthews, Ilford, England, assignor to The Plessey Company Limited, Ilford, England a British company
Filed Dec. 1, 1966, Ser. No. 598,313
Claims priority, application Great Britain, Dec. 3, 1965, 51,405/65
6 Claims. (Cl. 91—400)

ABSTRACT OF THE DISCLOSURE

To control a differential-piston hydraulic actuator ram by a sensor and maintain the response sensitivity independent of pump-delivery pressure while varying the latter according to the force to be overcome, pump-delivery pressure acts permanently on the small-areas side of the differential piston while a ram-control valve operated by the sensor controls the selective connection of the large-area side to drain and to pump inlet to restore normal sensor response. The pressure at the large-area side acts in turn against a spring to open a pump-load control spill valve which, by varying spill from pump delivery up to a maximum-spill position determined by an end stop, so varies the pump-delivery pressure as to maintain the large-area pressure substantially constant. A nudger valve operated by the ram keeps delivery pressure low when the ram piston is at the large-area end of its cylinder except when the ram-control valve is set for maximum spill from the large-area side of the ram piston.

Figure 1:
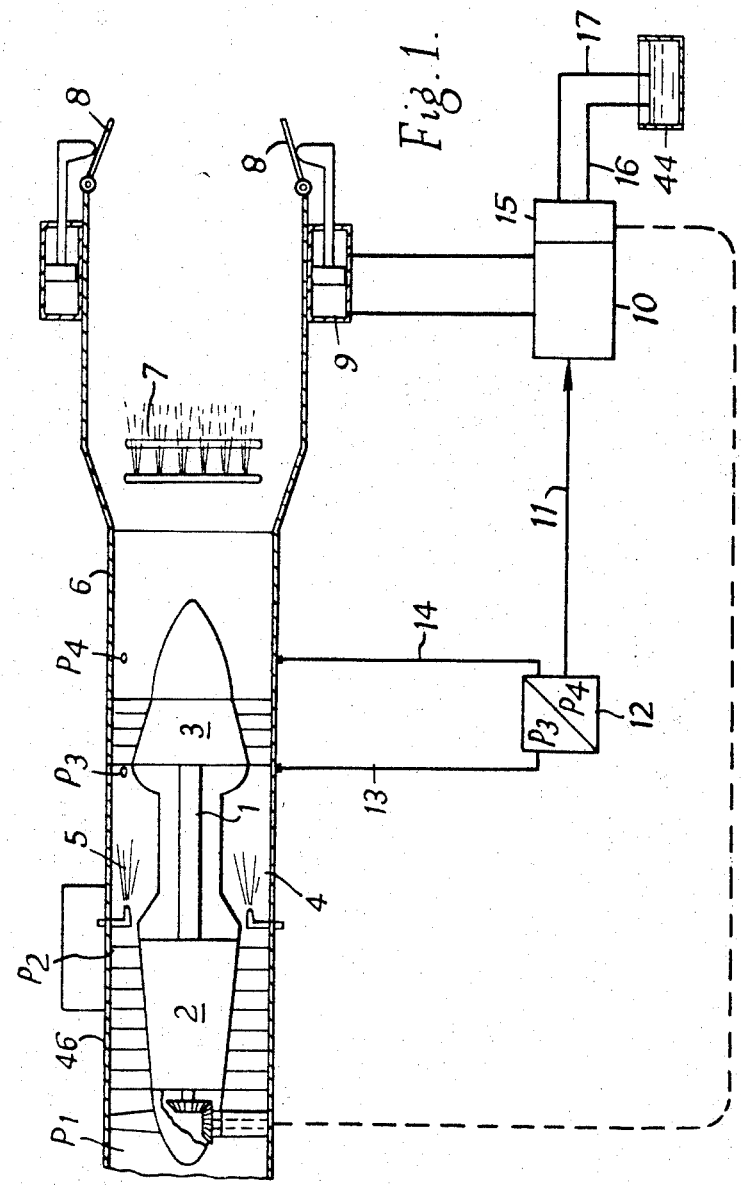

This invention relates to hydraulic actuators in which hydraulic power is supplied by a fixed-displacement pump and which employ a hydraulically operated differential piston and means for the automatic control, in response to error indications. The provision of such a device is desirable, for example in order to automatically so adjust the reheat-nozzle opening in the jet pipe of a jet-propulsion unit having an afterburner as to keep the ratio of the pressures at turbine inlet outlet substantially constant during the reheat operation. The invention has for an object to provide an improved sensor element, of a hydraulic actuator of this kind, which reduces power consumption by incorporating means operative to automatically vary the delivery pressure of the pump in accordance with the required actuating force while normally maintaining the relation of the response rate to the error indication of the sensor substantially constant. The provision of such a device is desirable, for example, in order to automatically so adjust the reheat nozzle opening in the jet pipe of a jet propulsion unit having an afterburner as to keep the ratio of the pressure at turbine inlet and outlet substantially constant during the reheat operation.

According to the present invention the delivery pressure of the fixed-displacement pump is arranged to act permanently on the small-area side of the differential piston while a primary control valve, operated by the sensor, controls selectively connection of the large-area side of the piston to either drain or pump delivery with a view to restoring the normal sensor response, while the pressure at the large-area side is in turn arranged to act, against a spring means, in a pump-load control valve causing the latter to so vary the pump delivery pressure by varying the magnitude of a spill outlet, as to maintain the pressure at the large-area side of the piston substantially constant while an end stop for the pump-load control valve prevents pump delivery pressure from being reduced below a minimum.

Preferably the spill outlet from the pump-control valve includes a port which is closed by the primary control valve when the latter requires the actuator to move towards the small-area side of the piston. The accompanying drawings illustrate one embodiment of the invention.

FIGURE 1 is a diagram showing an actuator with a control device according to the present invention as applied to the control of a reheat nozzle in a turbojet having an afterburner, and FIGURE 2 is a somewhat diagrammatic sectional elevation showing the differential-piston actuator and its control means in more detail.

Referring now first to FIGURE 1, a jet propulsion system for an aircraft comprises a continuous duct 46 in which a rotor shaft 1 carrying a turbocompressor wheel 2 is arranged at one end and a turbine wheel 3 at its other end; a combustion chamber 4 equipped with burner units 5 is interposed between the compressor and turbine. The pressures at compressor inlet, compressor outlet, turbine inlet, and turbine outlet will, in the usual manner, be respectively referred to as $P_1$, $P_2$, $P_3$ and $P_4$. The hot exhaust gases of the turbine flow through a jet pipe 6, which forms a continuation of the duct 46. The jet pipe is fitted with an afterburner unit 7 and with reheat-nozzle flaps 8 operable by a hydraulic actuator in the form of a differential-piston ram device 9, which is fed with hydraulic liquid from a pump 15 via a valve unit 10, the latter being controlled by the output element 11 of a pressure-ratio sensor 12 to which pressure-sensing connection lines 13 and 14 respectively admit the pressure $P_3$ at turbine inlet and the pressure $P_4$ at turbine outlet. The valve unit 10 is connected to the outlet of the pump, which as illustrated at 15 in FIGURE 2 is a fixed-displacement pump, the pump-delivery line being shown at 21, the pump-inlet line at 16, and a return line being shown at 17, and the valve unit 10 is intended to so control, with the help of the ram device 9, the operation of the nozzle flaps 8, as to maintain, irrespective of the operation of the afterburner, a constant pressure ratio $P_3/P_4$ as communicated to the valve unit 10 by the output element 11 of the sensor 12.

Referring now to FIGURE 2, the, or each, hydraulic actuator 9 has a differential piston 18, whose area at the right-hand side of the drawing is reduced by a piston rod 19 to about half of that at the left-hand side. Oil, which arrives from a sump 44 by line 16, is delivered by the gear pump 15, whose shaft 20 is driven by the turbine shaft 1, to a delivery line 21 which in customary manner is provided with a safety relief valve 22. The delivery line 21 communicates with the part 23 of the cylinder bore of the actuator 9 to the right of the differential piston 18, that is to say at the smaller-area side of this piston, and with an annular recess 24 in the valve spool 25 of a ram-control valve 10. This valve spool is mechanically connected to the output element 11 of the pressure-ratio sensor 12. The bore in which the valve spool 25 slides, is provided with a service port 26 communicating with that portion 27 of the actuator-cylinder bore which faces the larger area side of the piston 18, while the right-hand end of the bore in which the valve spool 25 slides and a port 45 of this bore, which faces a second annular recess 28, to be referred-to further below, of the valve spool 25, communicate with the return line 17 leading to the sump 44. The first-mentioned annular recess 24 in the valve spool 25 is separated from the right-hand end of the valve spool, which communicates with low pressure, by a land 29 which, when the pressure ratio is at its desired value and the sensor output element 15 therefore is in its illustrated normal position, is arranged to isolate the service port 26 from both the annular recess 24, which is at pump-delivery pressure, and from the low pressure at the right-hand end of the valve spool 25.

If the pressure ratio $P_3/P_4$ of the turbine 3 increases, thus requiring the nozzle flaps 8 to be moved to a more closed position, the pressure-ratio sensor 12 will move its output element 11 towards the left, thus allowing liquid from the chamber 27 at the large-area side of the piston 18 to escape through port 26 towards low-pressure return line 17, and as a result the piston 18 will move to the left-hand side of the figure, thereby moving the nozzle flaps 8 to a more closed position. This movement will continue until the pressure ratio $P_3/P_4$ has been restored to its original value, thus causing the pressure ratio sensor 12 to return the valve spool 25 to its illustrated normal position, in which port 26 is blanked off by the land 29. Corresponding corrective movements in the opposite directions will take place when the pressure ratio $P_3/P_4$ falls below its desired value.

It will also be readily appreciated that the force acting on the piston rod 19 is determined by the aerodynamic reaction of the flaps 8 to the flow in the jet pipe 6, and that this force will always, apart from friction effects, be balanced by the difference between the forces respectively exerted upon piston 18 on the one hand by the pump-delivery pressure acting on the smaller, right-hand area of the piston and on the other hand by the pressure at port 26, acting on the larger left-hand area of the same piston, and that, if no other provisions were made, the pump 15 would always have to work against its maximum pressure determined by the safety relief valve 22. It is a more specific object of the present invention to reduce the pump-delivery pressure below this value by bleeding off excess liquid while always ensuring adequacy of the pump delivery pressure for balancing the forces acting upon the piston rod 19. This is achieved by the provision of a pump-load control valve 30. This valve has a spool 31 which, similarly to the spool 25 of the ram control valve, has an annular recess 32. As shown in FIGURE 2, this recess is confined between two lands 33 and 34 of the spool and is in permanent communication with the pump delivery line 21. Referring still to FIGURE 2, the right-hand end of the valve spool 31 is exposed by a line 35 to the pressure in the larger-area end 27 of the cylinder bore of the ram device 9, causing the action of this pressure to oppose the action fo a spring 36 in the control of a port 37 in the bore of valve 30. This port 37 communicates with a port 45 in the bore containing the valve spool 25 of the primary control valve, and this port 45 normally faces the annular recess 28 of the valve spool 25, thus being open to the return line 17. If in these conditions the pressure in chamber 27 at the large-area side of piston 18 rises above a value determined by the setting of the spring 36, the land 33 of the valve spool 31 of the pump-load control valve 30 will allow liquid from the annular recess 32 of valve spool 31 and thus from pump-delivery line 21, to return to low pressure via the ports 37 and 28 until the throttle effect of port 37 is just sufficient to keep the action of the pressure in chamber 27 upon the valve spool 31 balanced with the action of the spring 36. An adjustable stop 38 is provided to limit the movement of the valve spool 31 in the venting direction, thus ensuring the maintenance of sufficient pressure in the pump-delivery line 21 to overcome friction effects however low the static force acting on the piston rod 19 may drop.

The aerodynamic forces acting on the nozzle flaps 8 and tending to move these to the open position are highest when flying at a low altitude and can become very small when flying at a high altitude, so much so that when during flight at high altitude the pressure-ratio sensor produces a signal requiring rapid opening of the throttle flaps, the friction forces opposing the opening movement may be greater than the aerodynamic forces which tend to open the flaps. In this case positive hydraulic action on the piston in the opening direction is required to produce and sustain the requisite rapid opening movement. Since on the other hand during this high-altitude flight the port 37 is wide open, so that the pressure in the delivery line 21 has been reduced to a minimum, the available pressure might in these circumstances be insufficient to produce the desired rapid movement of the actuator piston 18 in the flap-opening direction, which is to the right in FIGURE 2. This risk has been overcome in the illustrated embodiment by the provision of an additional land 40 in the valve spool 25. This land 40 is spaced by the above-mentioned annular recess 28 from a land 47 separating that recess from the recess 24 which is under pump-delivery pressure. When the valve spool 25 is moved appreciably to the right from the illustrated neutral position to cause the flaps 8 to be moved in the opening direction, the land 40 blanks off port 45 in the line of communication from spill port 37 of valve 30 to return line 17 via annular recess 28, thus preventing the spill action of valve 30 and forcing, subject only to the action of relief valve 22, all the liquid delivered by the pump 5 to flow to the ram cylinder to produce the desired rapid movement of the piston 18 in the flap-opening direction. As soon as the required opening movement has been completed and the pressure ratio $P_3/P_4$ has returned to normal, the spool 25 returns to its illustrated neutral position, and shortly before this position is reached, it re-opens the connection between the spill port 37 and the annular recess 28.

The illustrated embodiment of the invention further incorporates a so-called nudger valve 41 which controls an additional spill outlet 48 from pump delivery line 21, and which is, in all normal positions of the actuator, held closed by a spring 42. This valve 41 is equipped with an abutment rod 43 projecting into the large-diameter portion 27 of the ram cylinder in such manner that, when the actuator piston 18 approaches the end of its nozzle-closing stroke, the rod 43 is struck by the piston to return liquid from the pump-delivery line until the force of the piston 18 falls to the value required to hold the valve 41 open against its spring 42. In practice this valve becomes operative when the afterburners are out of action and will then ensure that, irrespective of the operation of the pressure-ratio sensor, in these circumstances pump-delivery pressure will be kept at the minimum required for holding the nozzle vanes in their fully closed position.

What I claim is:

1. A hydraulic actuator device for use with a fixed-displacement pump and a maximum-pressure relief valve, which comprises a differential-type actuator piston movable in a ram cylinder and subject to an external load tending to move the piston towards its small-area side, that end of said cylinder which faces the small-area side of the piston being permanently connected to the delivery side of said pump, a sensor actuated ram-control valve operative to selectively connect the other end of the ram cylinder to said pump delivery line or to a spill outlet, according to the sensor response, a further spill outlet from the pump delivery line, a pump-load control valve in said further spill outlet, spring bias means urging said pump-load control valve to a closed position, and fluid-pressure means communicating with said other end of the ram cylinder and operative to urge said pump-load control valve to an open position against the action of said spring bias means.

2. A hydraulic actuator device as claimed in claim 1, wherein permanently operative flow-restrictor means are provided in the spill outlet containing the pump-load control valve.

3. A hydraulic actuator device as claimed in claim 1, including an adjustable abutment limiting the spill-outlet opening stroke of the pump-load control valve.

4. A hydraulic actuator device as claimed in claim 1, wherein an additional spill outlet is connected to the pump-delivery line, said additional spill outlet including a valve normally held closed by spring means, the device further comprising abutment means operated by the ram piston, at the end of its stroke towards said other end of the ram cylinder, to open said normally closed valve against the action of said spring means.

5. A hydraulic actuator device as claimed in claim 1, wherein the ram-control valve includes closure means which cut off the further spill outlet when the ram-control valve is near that end of its stroke at which it establishes maximum communication between pump delivery and said other end of the ram cylinder.

6. A hydraulic actuator device as claimed in claim 5, wherein said ram-control valve includes a valve cylinder and a valve piston longitudinally slidable therein, the further spill outlet including a port in said valve cylinder, and said valve piston having a land arranged to close said port when the piston is within a predetermined distance from that end of its stroke at which it establishes maximum communication between pump delivery and said other end of the ram cylinder.

References Cited

UNITED STATES PATENTS

| | | | |
|---|---|---|---|
| 646,458 | 4/1900 | Pedrick | 91—417 |
| 1,549,745 | 8/1925 | Church | 91—433 |
| 2,381,923 | 8/1945 | Obtresal | 91—417 |
| 3,217,605 | 11/1965 | Bolton et al. | 91—189 |

PAUL E. MASLOUSKY, *Primary Examiner.*